US008732627B2

(12) United States Patent
Baseman et al.

(10) Patent No.: US 8,732,627 B2
(45) Date of Patent: May 20, 2014

(54) METHOD AND APPARATUS FOR HIERARCHICAL WAFER QUALITY PREDICTIVE MODELING

(75) Inventors: Robert J. Baseman, Brewster, NY (US); Jingrui He, Yorktown Heights, NY (US); Yada Zhu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/526,152

(22) Filed: Jun. 18, 2012

(65) Prior Publication Data

US 2013/0339919 A1    Dec. 19, 2013

(51) Int. Cl.
*G06F 17/50* (2006.01)

(52) U.S. Cl.
USPC ............................................. 716/50

(58) Field of Classification Search
USPC .................................... 716/100, 50
See application file for complete search history.

(56) References Cited

U.S. PATENT DOCUMENTS

| | | | | |
|---|---|---|---|---|
| 8,276,102 | B2* | 9/2012 | Heng et al. | 716/51 |
| 8,522,173 | B2* | 8/2013 | Heng et al. | 716/56 |
| 2008/0275586 | A1* | 11/2008 | Ko et al. | 700/110 |
| 2010/0312374 | A1* | 12/2010 | Tsai et al. | 700/110 |
| 2011/0219344 | A1* | 9/2011 | Heng et al. | 716/103 |
| 2012/0311570 | A1* | 12/2012 | Gandhi et al. | 718/1 |

OTHER PUBLICATIONS

Cai et al., Learning with Tensor Representation, Technical report, 2006, pp. 1-14, University of Illinois at Urbana-Champaign.
Chang et al., Virtual Metrology Technique for Semiconductor Manufacturing, International Joint Conference on Neural Networks, 2006, pp. 5289-5293, Vancouver, BC, Canada.
Dai et al., Tensor Embedding Methods, American Association for Artificial Intelligence, 2006, pp. 330-335, Department of Computer Science, Hong Kong University of Science and Technology, Clear Water Bay, Kowloon, Hong Kong.
He et al., Tensor Subspace Analysis, Neural Information Processing Systems, 2005, Department of Computer Science, University of Chicago, Department of Computer Science, University of Illinois at Urbana-Champaign.
Hochreiter et al., Classification, Regression, and Feature Selection on Matrix Data, Technical Report, 2004, Technische Universitat Berlin.
Kang et al., Virtual Metrology for Run-to-Run Control in Semiconductor Manufacturing, Expert Systems with Applications, 2011, pp. 2508-2522, vol. 38.
Khan et al., Virtual Metrology and Feedback Control for Semiconductor Manufacturing Processes Using Recursive Partial Least Squares, Journal of Process Control, 2008, pp. 961-974, vol. 18.

(Continued)

*Primary Examiner* — Suchin Parihar
(74) *Attorney, Agent, or Firm* — Daniel P. Morris, Esq.; Otterstedt, Ellenbogen & Kammer, LLP

(57) ABSTRACT

A method for performing enhanced wafer quality prediction in a semiconductor manufacturing process includes the steps of: obtaining data including at least one of tensor format wafer processing conditions, historical wafer quality measurements and prior knowledge relating to at least one of the semiconductor manufacturing process and wafer quality; building a hierarchical prediction model including at least the tensor format wafer processing conditions; and predicting wafer quality for a newly fabricated wafer based at least on the hierarchical prediction model and corresponding tensor format wafer processing conditions.

15 Claims, 7 Drawing Sheets

(56) References Cited

OTHER PUBLICATIONS

Kolda et al., Tensor Decompositions and Applications, Pre print of article to appear in SIAM Review, pp. 1-47, 2008. www.psu.edu.com.

Li et al., Discriminant Locally Linear Embedding With High-Order Tensor Data, IEEE Trans on Systems, Man, and Cybernetics, 2008, pp. 342-352, vol. 38 No. 2.

D. G. Luenberger, Linear and Nonlinear Programming, Second Edition, 1973, pp. 253-255, Addison-Wesley, Massachusetts.

Lynn et al., Virtual Metrology for Plasma Etch Using Tool Variables, IEEE Advanced Semiconductor Manufacturing Conference, 2009, pp. 143-148.

T. M. Mitchell, Machine Learning, Chapter 2, 1997, pp. 20-51, WCB/McGraw-Hill, New York.

J. C. Platt, Fast Training of Support Vector Machines Using Sequential Minimal Optimization, Advances in Kernel Methods, 1998, pp. 41-65.

Roweis et al., Nonlinear Dimensionality Reduction by Locally Linear Embedding, Science, 2000, pp. 2323-2326, vol. 290.

Su et al., Accuracy and Real-Time Considerations for Implementing Various Virtual Metrology Algorithms, IEEE Transactions on Semiconductor Manufacturing, 2008, pp. 426-434, vol. 21, No. 3.

Sun et al., Incremental Tensor Analysis: Theory and Applications, Transactions on Knowledge Discovery from Data, 2008, vol. 2, No. 3, Article 11.

Tao et al., Supervised Tensor Learning, ICDM, 2005, pp. 450-457, IEEE Computer Society.

Tao et al., Human Carrying Status in Visual Surveillance, Proceedings of the 2006 IEEE Computer Society Conference on Computer Vision and Pattern Recognition.

Tao et al., General Tensor Discriminant Analysis and Gabor Features for Gait Recognition, IEEE Trans. Pattern Analysis and Machine Intelligence, 2007, pp. 1-35, vol. 29, No. 10.

Tao et al., Bayesian Tensor Analysis, International Joint Conference on Neural Networks, 2008, pp. 1402-1409.

V.N. Vapnik, The Nature of Statistical Learning Theory, 2000, Springer-Verlag New York, New York.

Wang et al., Tracking by Third-Order Tensor Representation, IEEE Trans. on Systems, Man, and Cybernetics, 2011, pp. 385-396, vol. 41.

L. Wasserman, All of Statistics, 2009, pp. 209-216, Springer-Verlag New York, LLC, New York.

Soenjaya et al., Mining Wafer Fabrication: Framework and Challenges, Next Generation of Data-Mining Applications, The Institute of Electrical and Electronics Engineers, Inc., 2005, pp. 17-40, Wiley-IEEE Press, First Edition, Edited by Mehmed Kantardzic and Jozef Zurada.

\* cited by examiner

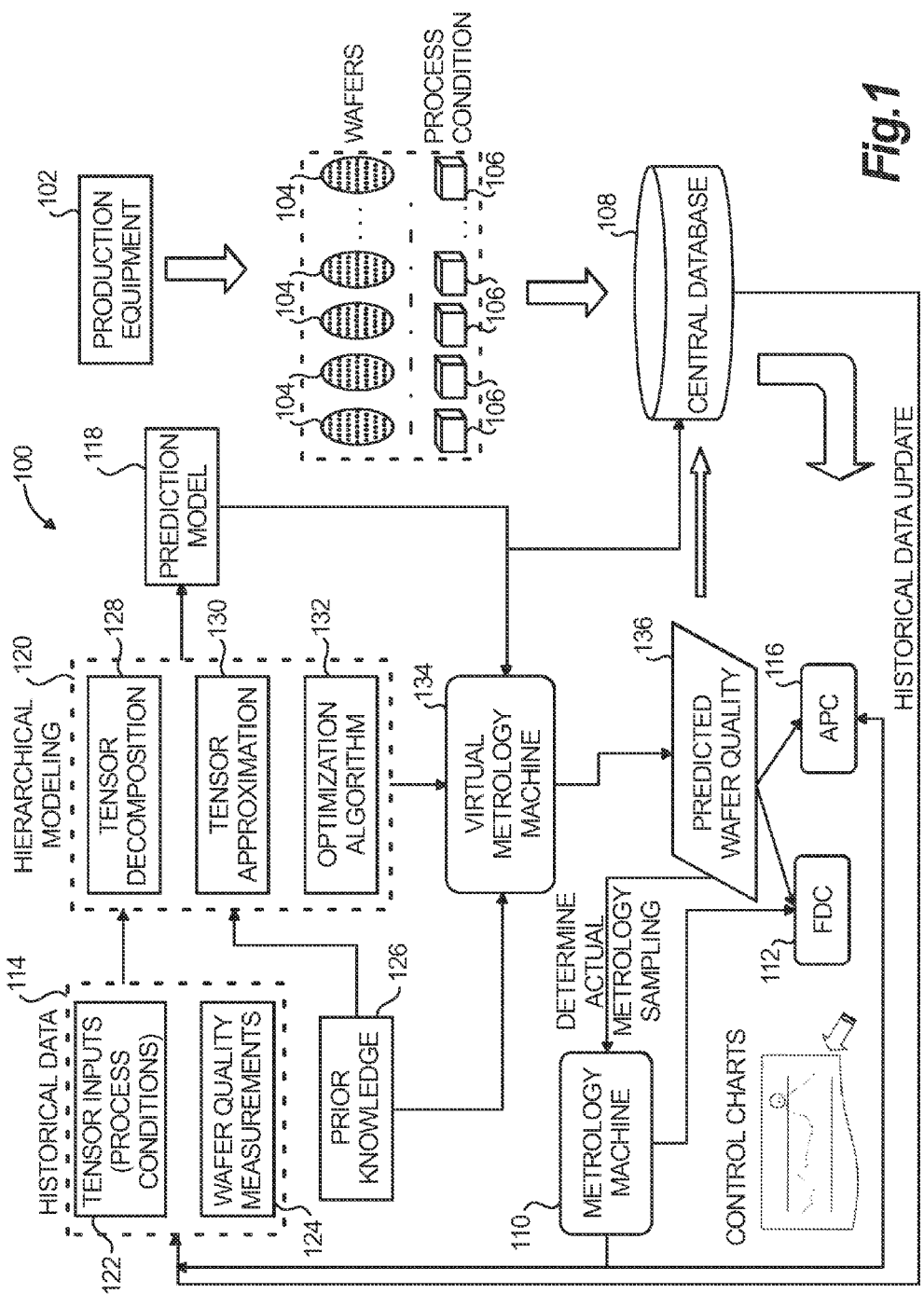

METHOD AND APPARATUS FOR HIERARCHICAL WAFER QUALITY PREDICTIVE MODELING

FIELD OF THE INVENTION

The present invention relates generally to the electrical, electronic, and computer arts, and more particularly relates to semiconductor wafer quality prediction.

BACKGROUND

In many real-world applications, input data is naturally expressed in the form of tensors or multi-dimensional arrays, such as, but not limited to, virtual metrology in semiconductor manufacturing, face recognition and gait recognition in computer vision, etc. For example, in the context of semiconductor manufacturing, each recipe process usually comprises multiple steps. During each step, process variables such as temperature, pressure and gas flow per unit time are precisely measured and monitored. Therefore, to predict wafer quality, the input data are naturally expressed as tensors. For example, for a single-chamber recipe, the tensors have three modes, namely steps, time within a step, and observed process variables or features; for multiple-chamber recipes, the tensors have four modes, with the additional mode being the chamber recipes accomplished on the same or different chambers in one tool; if summary statistics for each process variable in a single step are used instead of instantaneous measurements, the modes of the tensors are reduced by one. Another example is in computer vision, where images can be modeled as second-order tensors, and image sequences can be modeled as third-order tensors.

Conventionally, work on dealing with tensor data converts tensors into one-dimensional vectors and applies a rich methodology for vector inputs to build a model, either for classification or for regression. However, by converting tensors into vectors, valuable information embedded in the structure of the tensors is lost, such as, for example, feature correspondence in different steps, in the example of semiconductor manufacturing, or neighborhood information of a pixel, in the example of computer vision. Hence, existing approaches to handling tensor data result in inaccurate predictive modeling and are therefore undesirable.

SUMMARY

Embodiments of the invention provide a general optimization framework for handling tensor inputs which yields enhanced wafer quality predictive modeling. In contrast to conventional methods for supervised tensor learning which only use rank-one weight tensors in a linear model and therefore cannot readily incorporate domain knowledge, methodologies according to aspects of the invention provide a framework wherein weight tensors are obtained in a hierarchical manner.

In accordance with an embodiment of the invention, a method for performing enhanced wafer quality prediction in a semiconductor manufacturing process includes the steps of: obtaining data including at least one of tensor format wafer processing conditions, historical wafer quality measurements and prior knowledge relating to at least one of the semiconductor manufacturing process and wafer quality; building a hierarchical prediction model including at least the tensor format wafer processing conditions; and predicting wafer quality for a newly fabricated wafer based at least on the hierarchical prediction model and corresponding tensor format wafer processing conditions.

More particularly, in an illustrative embodiment, weight tensors are obtained by first approximating a weight tensor using a low-rank tensor, and then estimating the low-rank approximation using prior knowledge from one or more sources (e.g., different domain experts). This is motivated by wafer quality prediction in semiconductor manufacturing. Furthermore, embodiments of the invention provide an effective methodology, referred to herein as an H-MOTE (Hierarchical MOdeling with TEnsor inputs) algorithm, for solving this framework, which is guaranteed to converge. The time complexity of this algorithm is linear with respect to the number of examples as well as the size of the weight tensor.

In accordance with another embodiment of the invention, an apparatus for performing enhanced wafer quality prediction in a semiconductor manufacturing process includes memory for storing at least historical data relating to the semiconductor manufacturing process and at least one processor in operative communication with the memory. The processor is operative: to obtain data including at least one of tensor format wafer processing conditions, historical wafer quality measurements and prior knowledge relating to at least one of the semiconductor manufacturing process and wafer quality; to build a hierarchical prediction model including at least the tensor format wafer processing conditions; and to predict wafer quality for a newly fabricated wafer based at least on the hierarchical prediction model and corresponding tensor format wafer processing conditions.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 1 is a block diagram conceptually depicting at least a portion of an exemplary system for performing wafer quality predictive modeling, according to an embodiment of the invention;

Figure 2A:
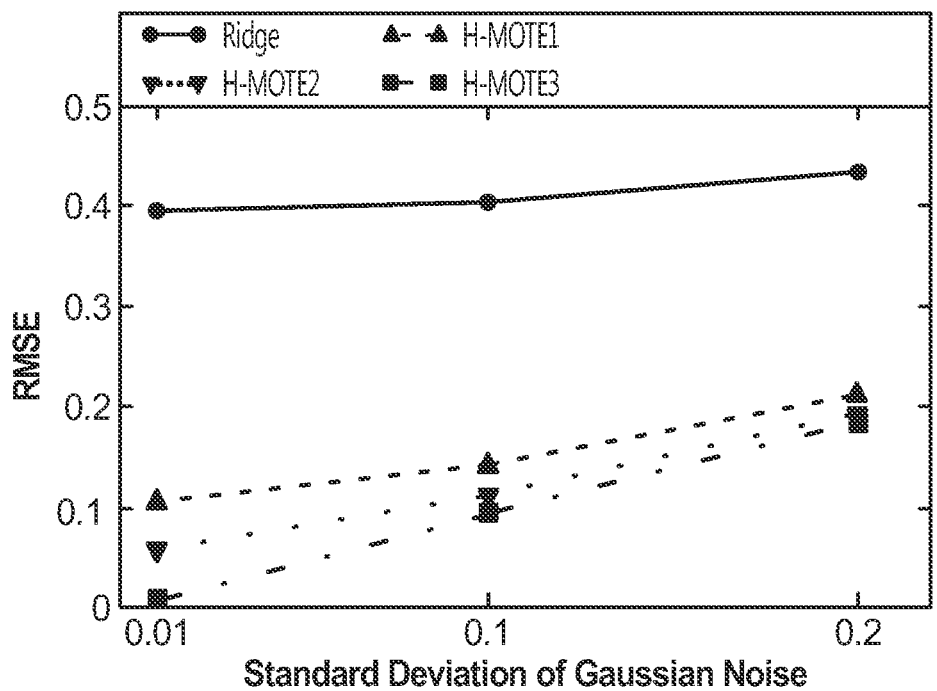
FIGS. 2A and 2B conceptually depict a comparison between exemplary methodologies according to embodiments of the invention employing hierarchical modeling with tensor inputs and ridge regression (vector input method) on synthetic data sets.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Aspects of the present invention will be described herein in the context of illustrative apparatus and methods for performing semiconductor wafer quality predictive modeling using tensor inputs in a hierarchical manner. It is to be appreciated, however, that the invention is not limited to the specific apparatus and/or methods illustratively shown and described herein. Nor is the invention necessarily limited to semiconductor wafer quality predictive modeling. Moreover, it will become apparent to those skilled in the art given the teachings herein that numerous modifications can be made to the embodiments shown that are within the scope of the present invention. That is, no limitations with respect to the specific embodiments described herein are intended or should be inferred.

FIG. 1 is a block diagram depicting at least a portion of an exemplary system 100 for performing wafer quality predictive modeling, according to an embodiment of the invention. The system 100 includes wafer production equipment 102 which is operative, for each process run, to fabricate semiconductor wafers 104 in accordance with prescribed process conditions 106 or other process parameters (e.g., recipe settings). The production equipment 102 comprises a process tool which, in one embodiment, may be any one of, for example, a photolithography tool, an etch tool, a deposition tool (e.g., chemical vapor deposition), an implantation tool (e.g., ion implantation), a polishing tool (e.g., chemical-mechanical polishing (CMP), a coating tool, a developing tool, or a thermal treatment tool, as will be apparent to those skilled in the art. Process conditions 106 and historical information relating to wafer process runs are preferably stored in a central database 108, or alternative storage means, for subsequent analysis and correlation with wafer test results, among other uses.

For each wafer process run, or lot, an actual sampling using one or more quality control (QC) sample wafers are generally measured after processing by one or more metrology tools, such as metrology machine 110, which is operative to generate measurement data. The measurement data generated by the metrology machine 110 can be used to calibrate and update an historical data module 114, to detect and classify processes (FDC) 112, and/or to update an advanced process control (APC) information module 116 which is used during execution of a process run to estimate metrology values for the wafers being processed and variations from prescribed target parameters are used to control (i.e., adjust) recipe settings in a traditional manner. An output generated by the wafer quality prediction and/or a hierarchical prediction model can be used to determine actual metrology sampling frequency.

In accordance with embodiments of the invention, a prediction model 118 is constructed based at least in part on data generated by a hierarchical modeling module 120. As part of a data collection procedure, the hierarchical modeling module 120 utilizes, as inputs thereto, historical wafer quality measurements 124 and associated process conditions 122, as well as prior knowledge 126 related to the process and wafer quality. As previously stated, the historical data module 114 is updated using output data generated by the metrology tool 110 and/or using information stored in the central database 108. The hierarchical modeling module 120, in constructing the prediction model 118, is operative to perform one or more of a tensor decomposition 128, a tensor approximation 130 and an optimization algorithm 132, as will be described in further detail herein below.

A virtual metrology (VM) module or machine 134 is adapted to predict newly fabricated wafer quality as a function of (i) the corresponding process information (tensor inputs), including prior knowledge 126, (ii) the prediction model 118 and (iii) information generated by the hierarchical modeling module 120. Based on an output generated by the VM machine 134, a prediction 136 can be made regarding newly fabricated wafer quality.

As discussion of an exemplary methodology for implementing hierarchical modeling according to embodiments of the invention will now be presented. As previously stated, conventional approaches for handling tensor data convert tensors into one-dimensional vectors and apply a rich methodology for vector inputs to build a model. However, by converting tensors into vectors, valuable information embedded in the structure of the tensors is lost, such as, for example, feature correspondence in different process steps in an illustrative semiconductor fabrication process.

To maximally exploit such valuable structural information embedded in the input tensors, embodiments of the invention address a problem of predictive modeling with tensor inputs by directly operating on the tensors. To this end, aspects of the invention provide a general optimization framework which predicts the output (or its probability of coming from each class) based on an inner product between the input tensor and a weight tensor. The weight tensor is then estimated in a hierarchical manner. More particularly, according to an exemplary embodiment, assume that the weight tensor has a low-rank approximation, and a canonical polyadic (CP) decomposition (or CPD), historically known as PARAFAC and later CANDECOMP (or Candecomp/Parafac), of the low-rank tensor can be further approximated based on prior information from various sources (e.g., different domain experts). This framework is motivated by wafer quality prediction in semiconductor manufacturing, where the input tensors have multiple dimensions which depend on the application scenario (e.g., multiple chamber recipes or a single chamber recipe) and data type (e.g., summary statistics for each process variable in a single step or instantaneous measurements).

On one hand, the features in a single step, or the same feature across different steps, tend to have similar values in the weight tensor, which leads to the assumption of low-rank approximation for the weight tensor. On the other hand, different domain experts may have various opinions regarding the relative importance of certain steps and certain features on predicting wafer quality, and leveraging their prior knowledge is desirable in order to improve the performance of the predictor, especially when the labeled set is small. The exemplary framework according to embodiments of the invention combines these two factors with the prediction loss in an objective function, which leads to an optimal solution for the weight tensor in the linear model.

Furthermore, embodiments of the invention provide an effective methodology for solving the optimization framework, referred to herein as H-MOTE (Hierarchical MOdeling with TEnsor inputs). This methodology is based on block coordinate descent (see, e.g., Yurii Nesterov, "Efficiency of coordinate descent methods on huge-scale optimization problems," *CORE Discussion Paper* (#2010/2), pp. 1-3, January 2010; Kai-Wei Chang et al., "Coordinate Descent Method for Large-scale L2-loss Linear Support Vector Machines," *Journal of Machine Learning Research*, 9: 1369-1398, 2008; and Peter Richtarik and Martin Takac, "Iteration Complexity of Randomized Block-Coordinate Descent Methods for Minimizing a Composite Function," *School of Mathematics, University of Edinburgh, pp.* 1-33, April 2011; the disclosures of which are incorporated herein by reference in their entireties for all purposes), which is beneficially guaranteed to converge to a local optimum since the objection function in the general framework has a unique minimum in each coordinate block. Experimental results on exemplary data sets and semiconductor manufacturing data sets demonstrate superior performance of the H-MOTE methodology compared with conventional techniques, as will be discussed in further detail herein below.

Wafers generally have to go through hundreds of processes to become a final integrated circuit (IC) device. Each process follows a prescribed recipe that defines detailed fabrication steps and settings of process parameters (i.e., process variables). In recent years, virtual metrology (VM), which essentially builds models to predict wafer quality based on historical measurements of wafer quality and corresponding process variables, has garnered much attention in the semiconductor industry. The predicted wafer quality can then be used in conjunction with a feedback control mechanism, to adjust process parameters in a timely fashion, to detect faulty wafers early in the process, and to improve productivity by reducing actual metrology frequency of wafer quality, among other benefits.

For this purpose, researchers have built statistical models such as multiple regression with feature selection, partial least squares, support vector machines (SVM) regression, and artificial neural networks, based on one-dimensional vectors converted from the input tensors. However, as previously explained, this conversion tends to lose useful information embedded in the structure of input tensors and is therefore undesirable. For example, for a certain recipe process, it may be the case that the process variables in a given step have a key impact on wafer quality. These types of prior knowledge have not been incorporated into the statistical model based on vectorized tensors. Alternatively, although real-time process variables can be represented as multivariate time-series, for VM applications, the objective is to predict the wafer quality rather than to forecast the process variables. Therefore, time-series analysis is not well-suited for this purpose. Accordingly, embodiments of the invention advantageously build a tensor-based model for wafer quality prediction which can incorporate the prior knowledge from various sources in a principled way.

Embodiments of the invention provide important modifications and enhancements to a supervised tensor learning approach. In accordance with an illustrative embodiment of the invention, the weight tensor of the underlying linear model is built in a hierarchical manner. Specifically, the weight tensor is first approximated using a low-rank tensor; the CP decomposition of the low-rank tensor is then estimated based on prior information from various sources. Conventional methods can be considered as special cases of the model according to embodiments of the invention in the sense that they only use rank-one weight tensors, whereas in the exemplary model according to embodiments of the invention, the rank of the optimal weight tensor can be more than one.

Compared with a P-SVM approach (see, e.g., S. Hochreiter and K. Obermayer, "Classification, regression, and feature selection on matrix data," Technical Report, *Technische Universitat Berlin,* 2004, the disclosure of which is incorporated by reference herein in its entirety for all purposes), there is no need to construct a data matrix, which involves complex interaction between the "row" objects and the "column" objects, and the illustrative method according to embodiments of the invention can be easily generalized to higher order tensors, whereas P-SVM can only be applied on second-order tensors (matrices). Furthermore, compared with existing methods in this group, methods according to embodiments of the invention are adapted to incorporate prior information from various sources in a principled way, whereas existing methods cannot leverage this information to improve the performance of the predictor.

A general optimization framework for hierarchical modeling with tensor inputs according to embodiments of the invention will now be described. As a preliminary matter, some notation used throughout this Detailed Description will be introduced. Consider N training samples $\{\chi, y_n\}, n=1, \ldots, N$, where $\chi_n \in \mathbb{R}^{d_1 \times \cdots \times d_K}$ is a K-dimensional array, or $K^{th}$-order tensor, and $y_n \in \mathbb{R}$ is a response variable for regression problems, or $y_n \in \{-1,1\}$ is a class label for classification problems. Notice that for $\chi_n$, K represents a dimension of this array or the number of modes of this tensor, and $d_k$ represents the number of elements along the $k^{th}$ dimension, $k=1, \ldots, K$. Therefore, the total number of input features is $\Pi_{k=1}^{K} d_k$. When K=1, the input $\chi_n$ is a vector, and the problem is reduced to regular regression or classification; when K=2, $\chi_n$ is a matrix; when K>2, $\chi_n$ is a $K^{th}$-order tensor. For the purpose of this example, we focus on cases where K>1, although it is to be understood that the invention is not limited to such cases. For such problems, the input tensor can always be converted into a vector by concatenating the fibers (i.e., data along a single dimension) along different modes, which are defined by fixing the indices of all the modes but one.

Note, that the vectorized version of the tensor may not be unique due to different orderings of the fibers. Well-established techniques for dealing with vector inputs to predict the value of $y_n$ can then be applied. However, in performing this conversion, the rich information embedded in the structure of $\chi_n$ will be lost, as previously stated. Consequently, an important objective of aspects of the invention is to predict the value of $y_n$ by making use of the structure of $\chi_n$.

Throughout this discussion, lower-case letters are used to denote scalers, boldface lower-case letters are used to denote vectors, and calligraphic (i.e., script) upper-case letters are used to denote tensors. By way of illustration only, let $\mathcal{T}_1$, $\mathcal{T}_2 \in \mathbb{R}^{d_1 \times \cdots d_K}$ denote two tensors. Define $\langle \mathcal{T}_1, \mathcal{T}_2 \rangle$ to be the inner product between tensors $\mathcal{T}_1$ and $\mathcal{T}_2$, which is the sum of the products of their corresponding elements. Furthermore, define a normal of tensor $\|\mathcal{T}\| = \sqrt{\langle \mathcal{T}_1, \mathcal{T}_2 \rangle}$.

In the framework according to embodiments of the invention, a rank-R approximation of the weight tensor is decomposed into a sum of vector outer products based on a CP decomposition. The CP decomposition factorizes a tensor into a sum of component rank-one tensors. For example, given third-order tensor $\mathcal{T} \in \mathbb{R}^{d_1 \times \cdots d_K}$, the tensor can be expressed as $$\mathcal{T} = \sum_{r=1}^{R} a_r \circ b_r \circ c_r \quad (1)$$

where R is a positive integer, $a_r \in \mathbb{R}^{d_1}$, $b_r \in \mathbb{R}^{d_2}$, $c_r \in \mathbb{R}^{d_3}$, and '∘' denotes a vector outer product operator. For ease of further explanation, we refer to $a_r \circ b_r \circ c_r$ as the $r^{th}$ component of $\mathcal{T}$, $r=1, \ldots, R$.

The rank of a tensor $\mathcal{T}$ is defined herein as the smallest number of rank-one tensors that generate $\mathcal{T}$ as their sum. In other words, in equation (1) above, the smallest value of R that satisfies the equality is indicative of the rank of $\mathcal{T}$. In particular, when R=1, for $K^{th}$-order tensors, we can decompose them into the outer product of K vectors, where K is an integer.

In the framework according to embodiments of the invention, a value of $y_n$ is predicted using a linear model, such as, for example, a linear regression model for regression problems and a logistic regression model for classification problems. Therefore, in this linear model, we have a weight tensor $\mathcal{C} \in \mathbb{R}^{d_1 \times \cdots d_K}$, which is the same size as $\chi_n$. An important principle of aspects of the invention is to model the weight tensor in a hierarchical manner; i.e., first approximate the weight tensor using a low-rank tensor whose CP decomposition is, in turn, estimated based on prior information from various sources.

More particularly, we minimize a loss function $L(y_n, \langle \chi_n, \mathcal{C} \rangle)$ summed over all the training samples. For example, $L(\bullet, \bullet)$ can be the squared loss in regression, or the logistic loss in classification. Here we require that $L(\bullet, \bullet)$ is convex with respect to the second argument. Based on the tensor structure, we assume that the weight tensor $\mathcal{C}$ can be approximated by a rank-R tensor with CP decomposition $\sum_{r=1}^{R} a_{1r} \circ a_{2r} \circ \ldots \circ a_{Kr}$, where R is equal to the number of sources where we could obtain domain knowledge, e.g., R domain experts, and $a_{kr} \in \mathbb{R}^{d_k}$ is the weight vector for the $k^{th}$ mode in the $r^{th}$ component. Therefore, $\|\mathcal{C} - \sum_{r=1}^{R} a_{1r} \circ a_{2r} \circ \ldots \circ a_{Kr}\|^2$ should be small. Intuitively, each weight vector $a_{Kr}$ reflects the importance of the $k^{th}$ mode of the input tensors in the $r^{th}$ component, and $a_{Kr}$ ($r=1, \ldots, R$) collectively measure the contribution of the $k^{th}$ mode of $\chi_n$ to the output $y_n$. For example, when K=2 and R=1, $\mathcal{C}$ is a matrix, and $\mathcal{C}(i,j)$ should be close to $a_{11}(i) \times a_{21}(j)$, where $\mathcal{C}(i,j)$ is the element of $\mathcal{C}$ in the $i^{th}$ row and $j^{th}$ column, $a_{11}(i)$ is the $i^{th}$ element of $a_{11}$, and $a_{21}(j)$ is the $j^{th}$ element of $a_{21}$. Furthermore, to estimate the weight vector $a_{Kr}$, the domain knowledge from R different sources is leveraged (e.g., domain experts). To be specific, for each $a_{Kr}$, we assume that it is close to vector $a_{kr0} \in \mathbb{R}^{d_k}$, which is provided a priori from the $r^{th}$ source, $r=1, \ldots, R$. Putting everything together yields the following:

$$\min f(\mathcal{C}, a_{kr}, k=1, \ldots, K, r=1, \ldots, R) = \sum_{n=1}^{N} L(y_n, \langle \chi_n, \mathcal{C} \rangle) + \\ \gamma_0 \left\| \mathcal{C} - \sum_{r=1}^{R} a_{1r} \circ a_{2r} \circ \ldots \circ a_{Kr} \right\|^2 + \sum_{k=1}^{K} \sum_{r=1}^{R} \gamma_{kr} \|a_{kr} - a_{kr0}\|^2 \quad (2)$$

where $\gamma_0$ and $\gamma_{kr}$ ($k=1, \ldots, K$, $r=1, \ldots, R$) are positive parameters that balance among different terms. In particular, the relative values of $\gamma_{1r}, \ldots, \gamma_{kr}$ reflect a confidence in using prior knowledge to approximate the weight vector in each mode of the $r^{th}$ component; the bigger the value of $\gamma_k$, the more confidence there is in the resulting approximation.

The objective function of Equation (2) above will now be interpreted from different perspectives. Specifically, if $L(y, \langle \chi_n, \mathcal{C} \rangle)$ is the squared loss for regression problems or logistic loss for classification problems, it reflects the negative log-likelihood of the $n^{th}$ sample, and Equation (2) can be interpreted from a probability perspective. More particularly, if the prior distribution of $\mathcal{C}$ is normal with mean $\sum_{r=1}^{R} a_{1r} \circ a_{2r} \circ \ldots \circ a_{Kr}$ and variance $$\frac{1}{2\gamma_0}$$

for each element, and the prior distribution of $a_{Kr}$ is normal with mean $a_{Kr0}$ and variance $$\frac{1}{2\gamma_{kr}}$$

for each element, then Equation (2) is the posterior probability of $\mathcal{C}$ and $a_{Kr}$ ($k=1, \ldots, K, r=1, \ldots, R$) given the data (up to a constant). Therefore, by minimizing Equation (2), MAP estimates of the weight tensor $\mathcal{C}$ as well as the weight vectors $a_{Kr}$ ($k=1, \ldots, K, r=1, \ldots, R$) can be determined.

On the other hand, traditional ridge regression and logistic regression for vector inputs can be seen as special cases of the optimization framework in accordance with aspects of the invention. To demonstrate this, simply fix $a_{Kr}$ ($k=1, \ldots, K$, $r=1, \ldots, R$) to be 0 vectors, and we have the same objective function as in ridge regression or logistic regression for vector inputs. In this way, when we try to minimize the original objective function with respect to both the weight tensor and the weight vectors, the second term on the right hand side of Equation (2) can be seen as a new regularizer which encourages a low-rank approximation of the weight tensor $\mathcal{C}$ instead of shrinking it to 0 (with rank 0) as in ridge regression and logistic regression. As will be shown herein below, use of this new regularizer effectively prevents over-fitting, especially when the labeled data is very scarce.

Hierarchical Modeling with Tensor Inputs (H-MOTE) Methodology

In accordance with another aspect of the invention, a superior methodology for calculating the weight tensor $\mathcal{C}$ that minimizes Equation (2) above is presented. With reference to Equation (2), notice that the function $f$ is not jointly convex with respect to $\mathcal{C}$ and $a_{Kr}$, k=1, ..., K, r=1, ..., R. However, if we fix $a_{Kr}$ and minimize $f$ with respect to $\mathcal{C}$, the following expression is obtained:

$$f_{a_{k_r}}(\mathcal{C}) = \sum_{n=1}^{N} L\left(y_n, \langle X_n, \mathcal{C}\rangle\right) + \gamma_0 \left\|\mathcal{C} - \sum_{r=1}^{R} a_{1r} \circ a_{2r} \circ \ldots \circ a_{Kr}\right\|^2 \quad (3)$$

Note, that the third term on the right side of Equation (2) is not dependent on $\mathcal{C}$. It can be shown that $f_{a_{k_r}}(\mathcal{C})$ is convex in $\mathcal{C}$, given that $L(\bullet, \bullet)$ is convex with respect to the second argument, and $$\frac{\partial f_{a_{k_r}}(\mathcal{C})}{\partial \mathcal{C}} = \sum_{n=1}^{N} l(y_n, \langle X_n, \mathcal{C}\rangle) X_n + 2\gamma_0 \left(\mathcal{C} - \sum_{r=1}^{R} a_{1r} \cdot a_{2r} \cdot \ldots \cdot a_{Kr}\right), \quad (4)$$

where $l(\bullet, \bullet)$ is the partial derivative of $L(\bullet, \bullet)$ with respect to the second argument.

Similarly, if we minimize $f$ with respect to $a_{ls}$, keeping $\mathcal{C}$ and $a_{kr}$ fixed, k≠l, r≠s, the following expression is obtained:

$$f_{\mathcal{C}, a_{kr}, k \neq l, r \neq s}(a_{ls}) = \gamma_0 \left\|\mathcal{C} - \sum_{r=1}^{R} a_{1r} \circ a_{2r} \circ \ldots \circ a_{Kr}\right\|^2 + \gamma_{ls} \|a_{ls} - a_{ls0}\|^2. \quad (5)$$

Notice that the first term on the right hand side of Equation (2) is not dependent on $a_{ls}$. It is observed that the function $f_{\mathcal{C}, a_{kr}, k \neq l, r \neq s}(a_{ls})$ is convex in $a_{ls}$, and $$\frac{\partial f_{\mathcal{C}, a_{kr}, k \neq l, r \neq s}(a_{ls})}{\partial a_{ls}} = 2\gamma_0(\alpha_{ls} a_{ls} - \beta_{ls} + \tau_{ls}) + 2\gamma_{ls}(a_{ls} - a_{ls0}) \quad (6)$$

where $a_{ls} = \langle a_{1s} \circ \ldots \circ a_{(l-1)s} \circ a_{(l+1)s} \circ \ldots \circ a_{Ks}, a_{1s} \circ \ldots \circ a_{(l-1)s} \circ a_{(l+1)s} \circ \ldots \circ a_{Ks}\rangle$, and $\beta_{ls}$, $\tau_{ls}$ are $d_l$-dimensional vectors. For $\beta_{ls}$, its $i^{th}$ element $\beta_{ls}(i) = \langle \mathcal{C}_{l=i}, a_{1s} \circ \ldots \circ a_{(l-1)s} \circ a_{(l+1)s} \circ \ldots \circ a_{Ks}\rangle$. Here, $\mathcal{C}_{l=i} \in \mathbb{R}^{d_1 \times \ldots \times d_K}$ is a (K−1)$^{th}$-order tensor. Its elements are equal to $\mathcal{C}$ with the index of the $l^{th}$ dimension fixed at i. For $\tau_{ls}$, its $i^{th}$ element $\tau_{ls}(i) = \langle \mathcal{T}_{lsi}, a_{1s} \circ \ldots \circ a_{(l-1)s} \circ a_{(l+1)s} \circ \ldots \circ a_{Ks}\rangle$. Here, $\mathcal{T}_{lsi} \in \mathbb{R}^{d_1 \times \ldots \times d_K}$ is a (K−1)$^{th}$-order tensor, and $\mathcal{T}_{lsi} = \Sigma_{r \neq s} a_{lr}(i) (a_{1r} \circ \ldots \circ a_{(l-1)r} \circ a_{(l+1)r} \circ \ldots \circ a_{Kr})$.

Therefore, setting Equation (6) above to zero, an optimal vector $a^*_{ls}$ that minimizes $f_{C, a_{kr}, k \neq l, r \neq s}(a_{ls})$ is determined as follows:

$$a^*_{ls} = \frac{\gamma_0 \beta_{ls} - \gamma_0 \tau_{ls} + \gamma_{ls} a_{ls0}}{\gamma_0 \alpha_{ls} + \gamma_{ls}} \quad (7)$$

Based on the above discussion, an illustrative embodiment of the invention makes use of a block coordinate descent method to find an optimal solution to Equation (2). The convergence of the block coordinate descent method is guaranteed since the objective function has a unique minimum in each coordinate block (see, e.g., D. G. Luenberger, "Linear and Nonlinear Programming," Addison-Wesley, Massachusetts, second edition, 1973, the disclosure of which is incorporated herein by reference in its entirety for all purposes). An exemplary H-MOTE methodology according to an embodiment of the invention is shown in pseudo-code representation below.

Input: $\chi_n$, $y_n$, n=1, ..., N, $\gamma_0$, $\gamma_{kr}$, $a_{Kr}$, (k=1, ..., K, r=1, ..., R), the number of iteration steps T
Output: Weight tensor $\mathcal{C}$ and weight vectors $a_{Kr}$ (k=1, ..., K, r=1, ..., R)

```
1:  Initialize α_Kr = α_K-0 (k = 1, ..., K, r = 1, ..., R)
2:  for t = 1 to T do
3:      Update the weight tensor C using gradient descent according
        to Equation (4)
4:      for k = 1 to K do
5:          for r = 1 to R do
6:              Update vector α_Kr according to Equation (7)
7:          end for
8:      end for
9:  end for
```

During the test stage, given a tensor $\chi$, we first calculate its inner product with the weight tensor $\mathcal{C}$, $\langle \chi, \mathcal{C}\rangle$, which can be used to predict the output for regression problems, or transformed into probabilities via the logistic function for classification problems.

In accordance with aspects of the invention, results of the hierarchical wafer quality predictive modeling approach can be used, for example in conjunction with a feedback control system, to control one or more parameters in a wafer fabrication process. In this manner, wafer quality and yield can be beneficially improved.

Experimental Results

By way of example only and without loss of generality, the performance of an exemplary H-MOTE methodology according to embodiments of the invention will now be described using both synthetic and real data sets. In particular, the discussion herein answers the following questions:

1. How does the performance of H-MOTE compare with the algorithms dealing with vectorized inputs?
2. How does the performance of H-MOTE compare with other supervised tensor learning algorithms?
3. Will additional features describing process variables improve the performance of H-MOTE in wafer quality prediction?
4. How is the performance of H-MOTE affected by small perturbations in the parameters?
5. How fast does H-MOTE converge to a local optimum?
6. Will higher-rank tensors improve the performance of H-MOTE?

To answer the first five questions, we fix R=1 in H-MOTE (i.e., we have inputs from one domain expert, and test the following variants).

H-MOTE 1: H-MOTE algorithm with $a_{k10}$ (k=1, ..., K) set to zero
H-MOTE2: H-MOTE algorithm with $a_{k10}$ (k=1, ..., K) given by a domain expert
H-MOTE3: H-MOTE algorithm with $a_{k10}$ (k=1, ..., K) set using the output of H-MOTE2

Figure 2B:
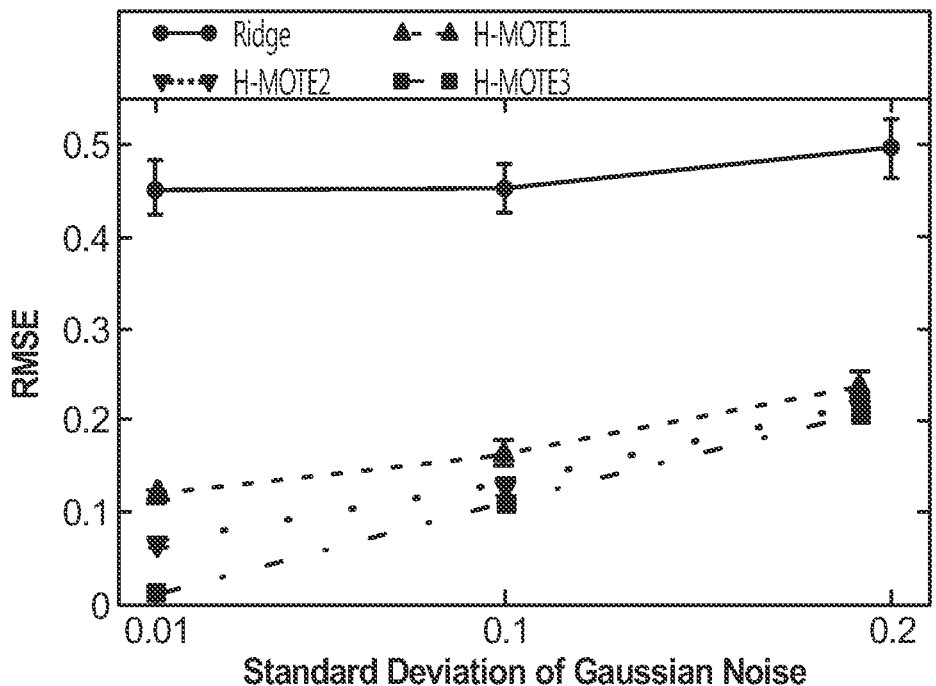

An answer to the first question will now be presented, and the three variants of the H-MOTE method (H-MOTE1 through H-MOTE3) are compared with ridge regression for vectorized inputs, represented as "Ridge" in the figures, on synthetic data sets (see, e.g., L. Wasserman, "All of Statistics," Springer-Verlag New York, LLC, New York, 2009, the disclosure of which is incorporated herein by reference in its entirety for all purposes). For this example, consider data sets comprising 1000 randomly generated samples represented as second-order tensors, or matrices. The outputs are obtained by first calculating the inner product between the input tensors and a rank-one weight tensor, and then adding Gaussian noise with increasing variance for different data sets. The results of five-fold cross-validation are shown in FIGS. 2A and 2B, where the x-axis indicates the standard deviation of the Gaussian noise, and the y-axis indicates the root mean squared error (RMSE) averaged over 50 runs. FIGS. 2A and 2B depict a comparison on synthetic data sets, with FIG. 2A illustrating training error and FIG. 2B illustrating test error.

From FIGS. 2A and 2B, we note that H-MOTE methods for tensor inputs are significantly better compared to ridge regression for vectorized inputs in terms of both the training error (see FIG. 2A) and the test error (see FIG. 2B). Additionally, on the test set, the standard deviation of RMSE for H-MOTE methods is much smaller compared with ridge regression. Using ridge regression, the difference between the average RMSE on the training set and on the test set is larger than using H-MOTE methods according to embodiments of the invention, proving that H-MOTE methods are more robust to overfitting. For example, with reference to FIGS. 2A and 2B, when the standard deviation of Gaussian noise is 0.01, using ridge regression, the difference in the average RMSE between the test set and the training set is more than 0.05, whereas using H-MOTE3, the difference is less than 0.002. This can be attributed to the novel regularizer used in H-MOTE methodologies which encourages a low-rank approximation of the weight tensor instead of shrinking it to zero as in Ridge. Finally, as evidenced from FIGS. 2A and 2B, as the standard deviation of the Gaussian noise is increased, the difference between H-MOTE methods and ridge regression decreases. This is consistent with expectations, since in the extreme case where the signal is overwhelmed by noise, no model is likely to provide satisfactory results.

The performance of the H-MOTE methodology was tested on three data sets collected from semiconductor manufacturing processes. The processes deposit dielectric material as capping film on wafers. A key measure of wafer quality is the deposition thickness of the deposited capping film. Each process has multiple recipe steps, which have multiple process variables and durations of time. The process variable such as gases and power take on different values at different steps. The process variables and tool conditions can drift at any time and cause wafer quality variation. At every second, the tool measures each variable for every wafer in processing. Thus, the data can be presented as a third-order tensor whose three modes are steps, seconds (time), and process variables. In most existing production control systems, summary statistics of each variable at each step are reported to the trace system for fault detection and wafer quality control, partially due to the different duration at different steps. Therefore, from a trace database, summary statistics of median or variance for each variable were obtained, which can be represented as second-order tensors.

A first data set corresponds to a process with a total of seven steps, each step having 17 process variables. The median of each process variable is obtained, which can be represented as a second-order tensor of size 7×17, or a vector of length 119. Second and third data sets correspond to a process with ten steps, each step having 15 process variables. For the second data set, the median of each process variable is used, which can be represented as a second-order tensor of size 10×15 or a vector of length 150; and for the third process, both the median and the variance are used, which can be represented as a second-order tensor of size 10×30 or a vector of length 300. Due to the low frequency of actual metrology, in a 9-month time period there are a total of 488 and 891 target measurements, respectively, for the two processes. Details of the data sets are summarized in Table 1 below.

TABLE 1

| Data Set | No. of Samples | No. of Steps | Number of Process Variables | Types of Summary Statistics | Dimensionality of Equivalent Vectors |
|---|---|---|---|---|---|
| 1 | 488 | 7 | 17 | 1 | 119 |
| 2 | 891 | 10 | 15 | 1 | 150 |
| 3 | 891 | 10 | 15 | 2 | 300 |

One reason for including the variance in the third data set is that some very critical process variables are typically well-controlled (e.g., through closed-loop control) during production. As a result, the first-order summary statistics, such as mean or median at certain steps, are sometimes constant over many wafers. In this case, the first-order statistics may have limited prediction influence for both vector-based and tensor-based predictive modeling. However, small departure of these critical variables from their respective prescribed specifications could induce large deviation of wafer quality from the target. Since the second-order statistics capture exactly such variation, it is used to enhance the predictive modeling in the third data set.

Figure 3:
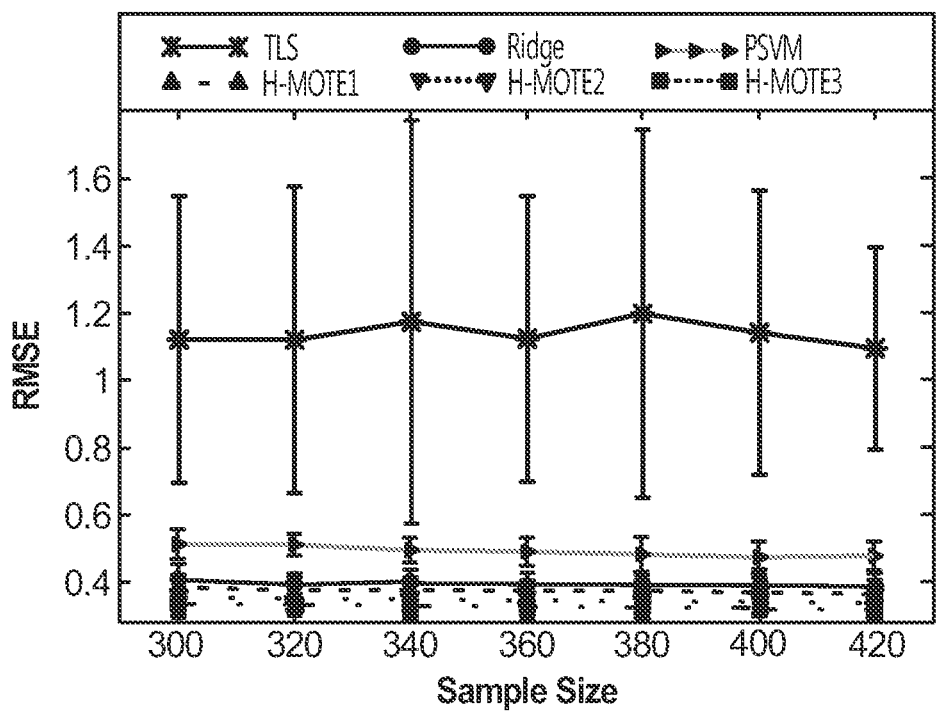
FIGS. 3-5 conceptually depict comparisons of root mean squared error (RMSE) for three variations of hierarchical modeling with tensor input methods, according to embodiments of the invention, and ridge regression, PSVM (potential support vector machine) (tensor input method) and TLS (tensor least squares) approaches on three different experimental data sets.
Figure 4:
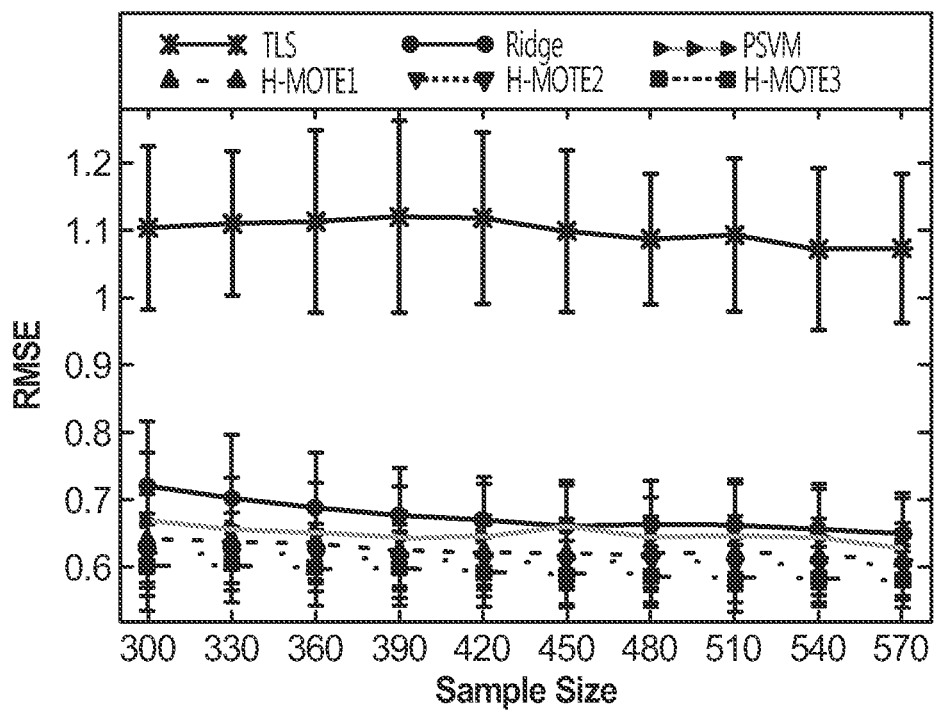
Figure 5:
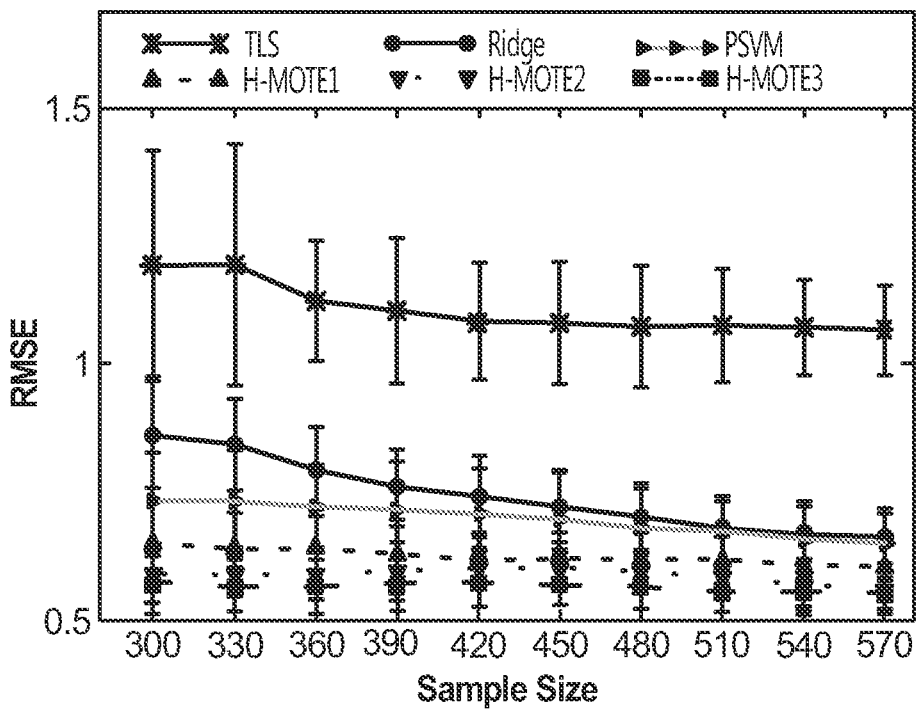

With reference to FIGS. 3-5, on real data sets, the three variants of H-MOTE were compared with three alternative prediction modeling approaches; namely, Ridge (ridge regression see, e.g., L. Wasserman, "All of Statistics," cited above), PSVM (Potential Support Vector Machine see, e.g., S. Hochreiter and K. Obermayer, "Classification, regression, and feature selection on matrix data," cited above), and TLS (Tensor Least Squares see, e.g., D. Cai, X. He, and J. Han, "Learning with tensor representation," *Technical Report*, University of Illinois at Urbana-Champaign, 2006, the disclosure of which is incorporate herein by reference in its entirety for all purposes). For all of these methods, cross-validation results of RMSE are used for comparison, and the parameters are chosen based on cross-validation in the training set only.

Next, answers to the first two questions posed above are provided on the real data sets. Comparison results of the six methods are shown in FIGS. 3-5. In these figures, the x-axis indicates the number of training samples, and the y-axis indicates the average RMSE. For each training set size, the experiments were run 50 times, and both the mean and the standard deviation are reported. More particularly, FIG. 3 conceptually illustrates a comparison of RMSE for the three H-MOTE method variants and the Ridge, PSVM and TLS approaches on data set 1. As shown, H-MOTE3 exhibits the lowest average RMSE of the six methods tested on data set 1. FIG. 4 conceptually illustrates a comparison of RMSE for the three H-MOTE method variants and the Ridge, PSVM and TLS approaches on data set 2. As shown, H-MOTE3 exhibits the lowest average RMSE of the six methods tested on data set 2. FIG. 5 conceptually illustrates a comparison of RMSE for the three H-MOTE method variants and the Ridge, PSVM and TLS approaches on data set 3. As shown, H-MOTE3 again exhibits the lowest average RMSE of the six methods tested on data set 3.

From FIGS. 3-5, the following observations can be made. First, performance of the H-MOTE methods are consistently superior to the Ridge method, which takes vectorized inputs. This is due, at least in part, to the fact that H-MOTE, according to embodiments of the invention, leverages the rich information embedded in the structure of the input tensors. Second, the performance of the H-MOTE methods are also better than existing supervised tensor learning methods (PSVM and TLS), which might be due to the special regularizer used in H-MOTE as well as integration of prior knowledge. Third, comparing H-MOTE2 and H-MOTE1 methods, the prior information provided by the domain expert used in H-MOTE2 helps improve performance. Fourth, in H-MOTE3, by using the output of H-MOTE2 as the prior information, RMSE is further reduced.

Furthermore, H-MOTE methods can provide useful insights regarding the manufacturing process, which are difficult (if at all possible) to obtain using vector-based methods. For example, data sets 2 and 3 contain measurements collected from plasma-enhanced chemical vapor deposition (PECVD). PECVD involves plasma to create ionization of several key precursors, which enhances the chemical reactions. A power related variable is one of the best indicators of the plasma. Using the H-MOTE1 methodology with zero vectors as the prior information, the maximum absolute value in $a_{11}$ exactly corresponds to this variable. Similarly, the maximum absolute value in $a_{21}$ corresponds to step 10 in this process, which makes sense intuitively since actual deposition is conducted at step 10. In addition, new insights can be obtained from the H-MOTE methods. For example, besides step 10, engineers tend to think that step 9 is relatively more important than the other steps since step 9 is a pre-deposition step. However, using H-MOTE methods, it can be shown that steps 2 and 8 are more important than step 9 in terms of their values in $a_{21}$. This can be explained by the facts that (i) two types of important gas flow are turned on in step 2, and (ii) the duration of steps 2 and 8 is longer than that of step 9.

Figure 6:
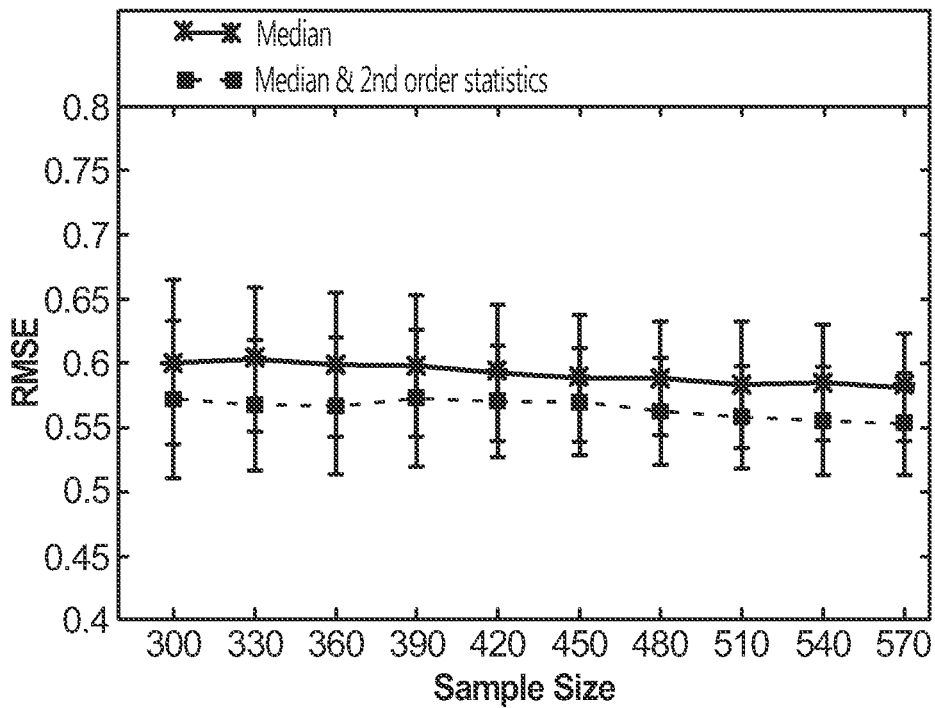
FIG. 6 conceptually depicts a comparison of one variation of the hierarchical modeling with tensor input methods according to an embodiment of the invention on two experimental data sets.

In answer to the third question noted above regarding features used in wafer quality prediction, FIG. 6 conceptually depicts a comparison of the H-MOTE3 method on the two experimental data sets. As previously stated, the second and third data sets correspond to the same process with different inputs. Data set 2 only uses the median of each process variable in a single step, whereas data set 3 uses both the median and the variance. From FIG. 6, it is seen that including second-order statistics indeed improves the performance in terms of average RMSE of cross-validation. For example, when the sample size is 300, using median alone, the average RMSE is 0.600, whereas using both median and variance, the average RMSE is 0.572. Thus, using both first-order and second-order statistics leads to better performance compared with using first-order statistics alone.

Figure 7A:
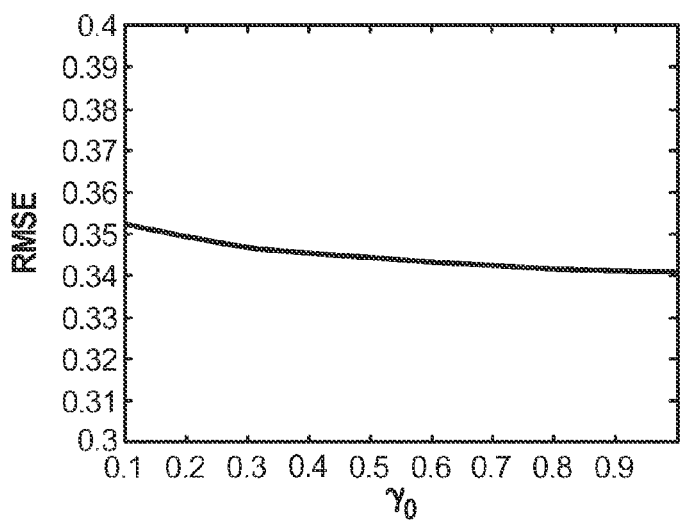
FIGS. 7A-7C conceptually depict RMSE corresponding to hierarchical modeling with tensor input methods according to an embodiment of the invention for different experimental values of parameters.
Figure 7B:
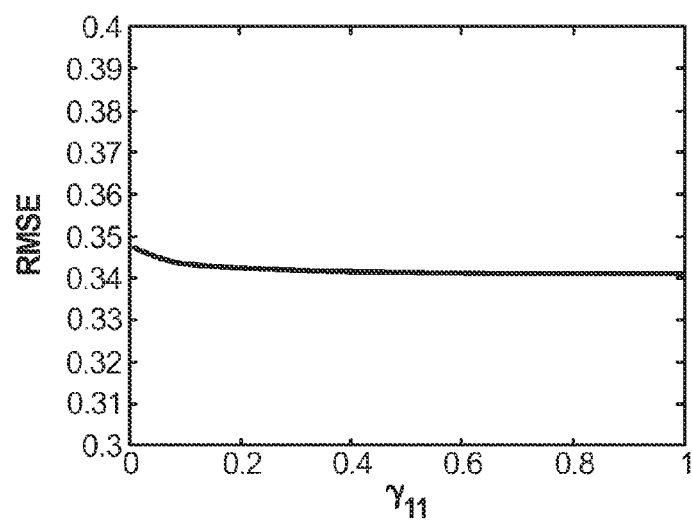
Figure 7C:
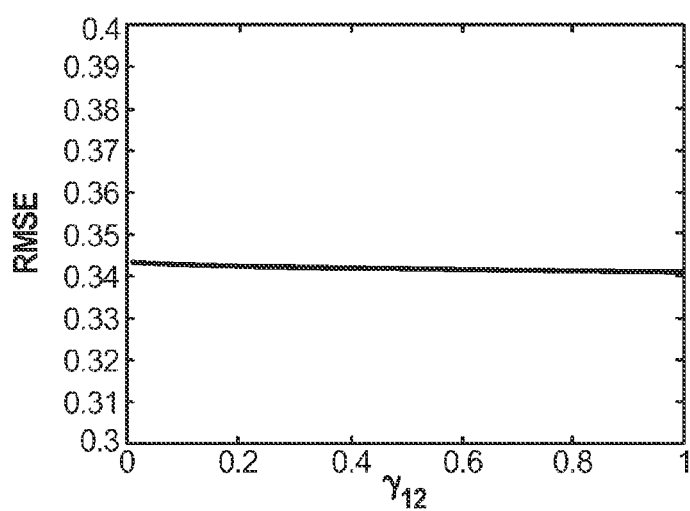

With reference to FIGS. 7A-7C, an answer to the fourth question posed above is presented. To this end, the first data set is used to evaluate the robustness of the H-MOTE method with respect to its parameters $\gamma_0$, $\gamma_{11}$ and $\gamma_{12}$. Specifically, we first find optimal values for $\gamma_0$, $\gamma_{11}$ and $\gamma_{12}$ based on cross-validation in the training set, then we keep two of the values fixed and test the RSME of H-MOTE under small perturbations of the remaining parameter.

FIGS. 7A-7C conceptually depict RMSE corresponding to the H-MOTE method according to an embodiment of the invention for different experimental values of the parameters $\gamma_0$, $\gamma_{11}$ and $\gamma_{12}$. From the figures, it can be seen that the performance of H-MOTE is quite stable for all three parameters over a wide range, which demonstrates the robustness of the methodology according to embodiments of the invention. As a worst-case scenario, wherein the parameter $\gamma_0$ is varied while keeping $\gamma_{11}$ and $\gamma_{12}$ fixed (FIG. 7A), a variation in RMSE of about 3% is exhibited by the H-MOTE method.

Figure 8:
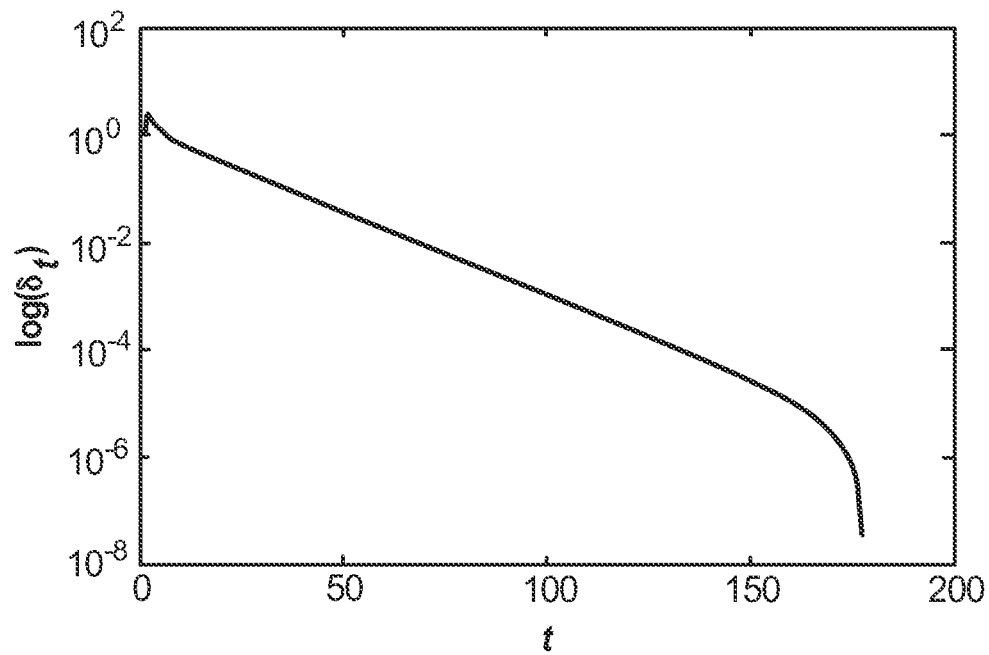
FIG. 8 conceptually depicts a convergence analysis of a hierarchical modeling with tensor input method according to an embodiment of the invention.

With reference to FIG. 8, an answer to the fifth question posed above is provided. Specifically, FIG. 8 conceptually depicts convergence of the H-MOTE method. To evaluate the rate of convergence, experiments were performed using the first data set. It is assumed that the H-MOTE algorithm converges if the change of the estimated weight tensor $\mathcal{C}$ and estimated weight vectors $a_{11}$ and $a_{12}$ is less than $10^{-7}$. The algorithm was allowed to run a sufficiently large number of iterations to obtain optimal values $\mathcal{C}^*$, $a^*_{11}$, and $a^*_{12}$. Then, at iteration t, a difference between the current estimates and their optimal value, $\delta_t$, is calculated, $$\delta_t = \sqrt{\|\mathcal{C}_t - \mathcal{C}^*\|^2 + \|a_{11,t} - a^*_{11}\|^2 + \|a_{12,t} - a^*_{12}\|^2},$$

where $\mathcal{C}_t$, $a_{11,t}$ and $a_{12,t}$ are the estimated tensor and weight vectors at iteration t.

In FIG. 8, the natural log of $\delta_t$ is plotted versus the iteration number t. As seen in FIG. 8, the natural log of $\delta_t$ approximately linearly corresponds with iteration number (i.e., a straight line) when t is small (e.g., 25 to 150 iterations). When t becomes larger, the convergence rate is even faster. This demonstrates that the H-MOTE methodology converges at least exponentially.

Figure 9:
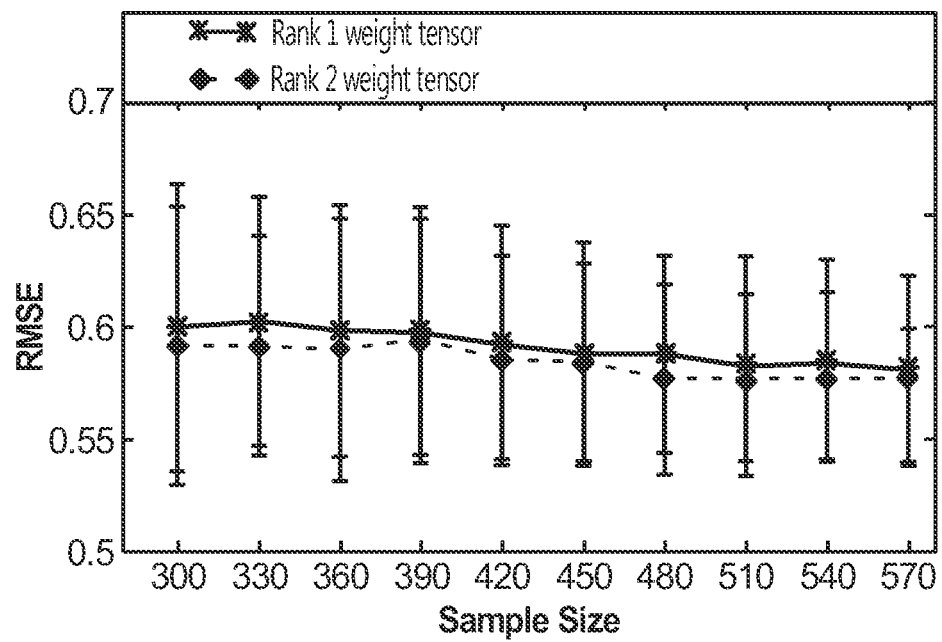
FIG. 9 conceptually depicts comparison results of the hierarchical modeling with tensor input methods according to an embodiment of the invention for two different ranks of weight tensor on an experimental data set.

An answer the sixth question posed above will be provided with reference to FIG. 9. In the optimization framework according to aspects of the invention, the rank R depends on the number of sources where domain knowledge can be obtained (e.g., R domain experts). Next, the performance of the H-MOTE method is tested with R=2, where one source of prior knowledge is from the domain expert and the other source is from the H-MOTE1 method variant with R=1. Comparison results of H-MOTE with R=1 and R=2 on the second data set are shown in FIG. 9. From this figure, it is seen that larger values of R are able to further improve the performance of the H-MOTE method, at least in terms of the average RMSE of cross-validation. This is consistent with expected results, since more domain knowledge generally leads to better performance in predictive modeling.

Embodiments of the invention provide a general optimization framework for hierarchical modeling with tensor inputs, which is motivated by wafer quality prediction in semiconductor manufacturing. This optimization framework directly operates on the input tensors instead of converting them to vectors, thereby eliminating the loss of valuable information embedded into the structure of the tensor. Moreover, the optimization framework according to embodiments of the invention is able to incorporate domain knowledge in a principled way. In accordance with other aspects of the invention, an effective method referred to herein as H-MOTE (hierarchical modeling with tensor inputs) based on block coordinate descent is presented to efficiently solve the optimization framework. The H-MOTE methodology is guaranteed to converge to a local optimum, and it has linear time complexity with respect to the total number of samples and the number of elements in the weight tensor. Using synthetic and real data sets collected from semiconductor manufacturing, the methodology according to embodiments of the invention demonstrates consistently superior performance compared with both vector-based methods and tensor-based methods at least in terms of prediction errors.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product, the computer program product in turn comprising a tangible computer readable storage medium storing in a non-transitory manner executable program instructions which, when executed, implement method steps according to an embodiment of the invention.

One or more embodiments of the invention, or elements thereof, can be implemented in the form of an apparatus including a memory and at least one processor that is coupled to the memory and operative to perform exemplary method steps.

Figure 10:
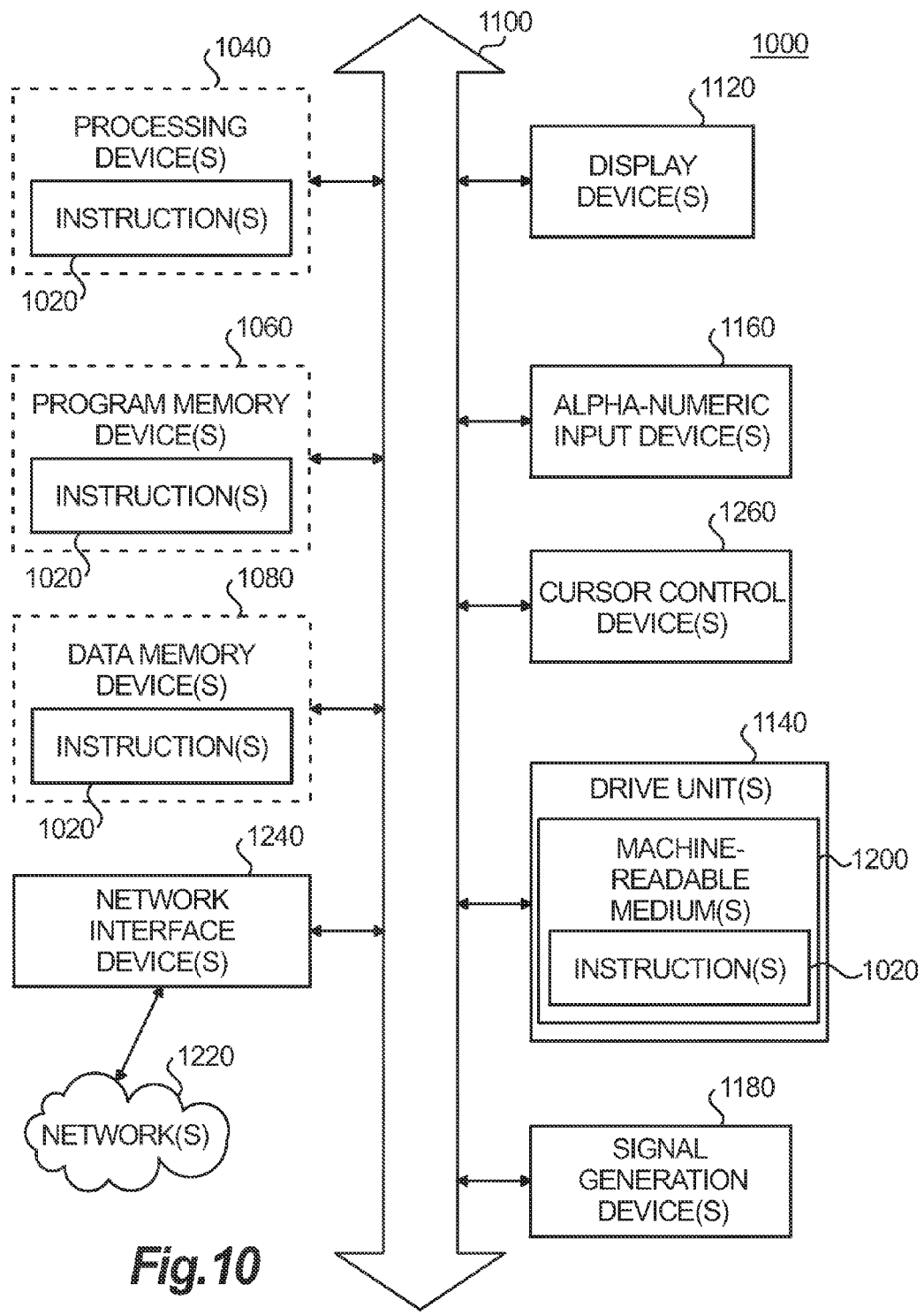
FIG. 10 is a block diagram depicting at least a portion of an exemplary machine in the form of a computing system configured to perform methods according to embodiments of the invention.

FIG. 10 is a block diagram of an embodiment of a machine in the form of a computing system 1000, within which is a set of instructions 1020 that, when executed, cause the machine to perform any one or more of the methodologies according to embodiments of the invention. In some embodiments, the machine operates as a standalone device. In some embodiments, the machine is connected (e.g., via a network 1220) to other machines. In a networked implementation, the machine operates in the capacity of a server or a client-user machine in a server-client user network environment. Exemplary implementations of the machine as contemplated herein include, but are not limited to, automated test equipment (ATE), a server computer, client-user computer, personal computer (PC), tablet PC, personal digital assistant (PDA), mobile device, palmtop computer, laptop computer, desktop computer, communication device, personal trusted device, web appliance, or any machine capable of executing a set of instructions (sequential or otherwise) that specify actions to be taken by that machine.

The computing system 1000 includes a processing device(s) 1040 (e.g., a central processing unit (CPU), a graphics processing unit (GPU), or both), program memory device(s) 1060, and data memory device(s) 1080, which communicate with each other via a bus 1100. The computing system 1000 further includes display device(s) 1120 (e.g., liquid crystals display (LCD), flat panel, solid state display, or cathode ray tube (CRT)). The computing system 1000 includes input device(s) 1160 (e.g., a keyboard), cursor control device(s) 1260 (e.g., a mouse), disk drive unit(s) 1140, signal generation device(s) 1180 (e.g., a speaker or remote control), and network interface device(s) 1240, operatively coupled together, and/or with other functional blocks, via bus 1100.

The disk drive unit(s) 1140 includes machine-readable medium(s) 1200, on which is stored one or more sets of instructions 1020 (e.g., software) embodying any one or more of the methodologies or functions herein, including those methods illustrated herein. The instructions 1020 also reside, completely or at least partially, within the program memory device(s) 1060, the data memory device(s) 1080, and/or the processing device(s) 1040 during execution thereof by the computing system 1000. The program memory device(s) 1060 and the processing device(s) 1040 also constitute machine-readable media. Dedicated hardware implementations, such as but not limited to application specific integrated circuits, programmable logic arrays, and other hardware devices are configured to implement the methods described herein. Applications that include the apparatus and systems of various embodiments broadly comprise a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments, the methods, functions, or logic described herein are implemented as one or more software programs running on a computer processor. Dedicated hardware implementations including, but not limited to, application specific integrated circuits, programmable logic arrays and other hardware devices are configured to implement the methods described herein. Further, alternative software implementations including, but not limited to, distributed processing or component/object distributed processing, parallel processing, or virtual machine processing are configured to implement the methods, functions, or logic described herein.

The embodiment contemplates a machine-readable medium or computer-readable medium containing instructions 1020, or that which receives and executes instructions 1020 from a propagated signal so that a device connected to a network 1220 can send or receive voice, video or data, and to communicate over the network 1220 using the instructions 1020. The instructions 1020 are further transmitted or received over the network 1220 via the network interface device(s) 1240. The machine-readable medium also contains a data structure for storing data useful in providing a functional relationship between the data and a machine or computer in an illustrative embodiment of the systems and methods herein.

While the machine-readable medium 1020 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

It should also be noted that software, which implements the methods, functions or logic herein, are optionally stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein and other equivalents and successor media, in which the software implementations herein are stored.

The illustrations of embodiments of the invention described herein are intended to provide a general understanding of the structure of the various embodiments, and they are not intended to serve as a complete description of all the elements and features of apparatus and systems that might make use of the structures described herein. Many other embodiments will become apparent to those of skill in the art upon reviewing the above description. Other embodiments are utilized and derived therefrom, such that structural and logical substitutions and changes are made without departing from the scope of this disclosure. Figures are also merely representational and are not necessarily drawn to scale. Certain proportions thereof may be exaggerated, while others diminished in order to facilitate an explanation of the embodiments of the invention. Accordingly, the specification and drawings are to be regarded in an illustrative rather than a restrictive sense.

Such embodiments of the inventive subject matter are referred to herein, individually and/or collectively, by the term "embodiment" merely for convenience and without intending to voluntarily limit the scope of this application to any single embodiment or inventive concept if more than one is in fact shown. Thus, although specific embodiments have been illustrated and described herein, it should be appreciated that any arrangement calculated to achieve the same purpose are substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single embodiment. Thus the following claims are hereby incorporated into the Detailed Description, with each claim standing on its own as a separate example embodiment.

The Abstract is provided to comply with 37 C.F.R. §1.72 (b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single embodiment. Thus the following claims are hereby incorporated into the Detailed Description, with each claim standing on its own as separately claimed subject matter.

Although specific example embodiments have been described, it will be evident that various modifications and changes are made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and without limitation, specific embodiments in which the subject matter are practiced. The embodiments illustrated are described in sufficient detail to enable those skilled in the art to practice the teachings herein. Other embodiments are utilized and derived therefrom, such that structural and logical substitutions and changes are made without departing from the scope of this disclosure. This Detailed Description, therefore, is not to be taken in a limiting sense, and the scope of various embodiments is defined only by the appended claims, along with the full range of equivalents to which such claims are entitled.

Given the teachings of the invention provided herein, one of ordinary skill in the art will be able to contemplate other implementations and applications of the techniques of the invention. Although illustrative embodiments of the invention have been described herein with reference to the accompanying drawings, it is to be understood that the invention is not limited to those precise embodiments, and that various other changes and modifications are made therein by one skilled in the art without departing from the scope of the appended claims.

What is claimed is:

1. A method for performing enhanced wafer quality prediction in a semiconductor manufacturing process, the method comprising steps of:
   obtaining, with a processor, data including at least one of tensor format wafer processing conditions, historical wafer quality measurements and prior knowledge relating to at least one of the semiconductor manufacturing process and wafer quality;
   building, with said processor, a hierarchical prediction model including at least the tensor format wafer processing conditions; and
   predicting, with said processor, wafer quality for a newly fabricated wafer based at least on the hierarchical prediction model and corresponding tensor format wafer processing conditions.

2. The method of claim 1, wherein the step of building the hierarchical prediction model comprises:
   decomposing higher-order weight tensors into lower-order tensors;
   approximating the lower-order tensors based at least in part on the prior knowledge; and
   minimizing a prediction error and optimizing an approximation of the lower-order tensors as a function of the prediction error.

3. The method of claim 2, wherein the step of decomposing higher-order weight tensors into lower-order tensors is performed using a canonical polyadic decomposition.

4. The method of claim 2, wherein the step of decomposing higher-order weight tensors into lower-order tensors comprises approximating each of the higher-order weight tensors by a rank-R tensor with a canonical polyadic decomposition, where R is indicative of a number of sources from which domain knowledge is obtained.

5. The method of claim 4, wherein R is greater than one.

6. The method of claim 2, wherein the step of optimizing an approximation of the lower-order tensors is performed using a block coordinate decent methodology.

7. The method of claim 2, further comprising updating at least one of the tensor format wafer processing conditions, historical wafer quality measurements and prior knowledge as a function of an approximation of the lower-order tensors.

8. The method of claim 1, wherein the step of building a hierarchical prediction model comprises minimizing a loss function $L(y_n, \langle \chi_n, \mathcal{C} \rangle)$ summed over all training samples, where $y_n$ is a response variable for a regression, $\chi_n$ is a $K^{th}$-order tensor, where K is an integer indicative of a number of modes of the tensor $\chi_n$, n is a training sample number, and $\mathcal{C}$ is a weight tensor.

9. The method of claim 1, wherein the step of building the hierarchical prediction model is performed using tensor inputs without converting the tensor inputs to corresponding vectors.

10. The method of claim 1, further comprising utilizing an output generated by at least one of the step of predicting wafer quality and the hierarchical prediction model to perform advanced process control (APC) relating to the semiconductor manufacturing process.

11. The method of claim 1, further comprising utilizing an output generated by at least one of the step of predicting wafer quality and the hierarchical prediction model to perform wafer quality fault detection and classification (FDC).

12. The method of claim 1, further comprising utilizing an output generated by at least one of the step of predicting wafer quality and the hierarchical prediction model to determine actual metrology sampling frequency.

13. The method of claim 1, wherein the prior knowledge relating to at least one of the semiconductor manufacturing process and wafer quality comprises information from a plurality of sources.

14. The method of claim 1, wherein the step of building the hierarchical prediction model comprises utilizing rich information embedded in a tensor structure of the tensor format wafer processing conditions.

15. The method of claim 1, wherein the step of building the hierarchical prediction model comprises representing feature correspondence in one or more steps of the semiconductor manufacturing process.

\* \* \* \* \*